Patented May 5, 1931

1,803,557

UNITED STATES PATENT OFFICE

FRANK L. ORMESHER, OF CINCINNATI, OHIO, ASSIGNOR TO CEMROC, INC., OF CINCINNATI, OHIO, A CORPORATION OF OHIO

BUILDING MATERIAL

No Drawing.    Application filed July 18, 1928.   Serial No. 293,791.

My invention relates to compounds for water proofing and accelerating the setting of concrete, and, in particular, to the method of making compounds for such use.

It is the object of my invention to provide a compound that may be cheaply and accurately made, which will readily mix with varying types of aggregate and which will waterproof concrete, particularly concrete formed under pressure, and will accelerate its setting so that it may be rapidly removed from its mold and support.

Specifically, my invention consists of heating a half gallon of water to boiling point and adding thereto two pounds of double press stearic acid. It is preferable to add the stearic acid after the water has been heated, but it is not essential.

When the stearic acid is so suitably softened by the hot water, I mix separately a small quantity of caustic soda to the extent of from 3½ to four ounces, and a small amount of cold or warm water. I add the caustic soda to the stearic acid solution gradually and only in a sufficient amount to make the stearic acid solution a soapy mass.

I then mix separately from five to six ounces of calcium chloride in a gallon of water, preferably cold, and dissolve. I add this solution of calcium chloride to the stearic acid and caustic soda combination, which produces a soft mass of large bulk. I then extract a suitable amount of water to secure the proper consistency, before adding the powdered calcium chloride. The proper consistency is that of workable putty.

I then mix with the combination about 10 per cent powdered form of calcium chloride.

The above mixture should be used in cement when the weather temperature is 40 degrees Fahrenheit and above, and the percentage of calcium chloride used in the above mixture should be increased on a sliding scale corresponding to the decrease in the weather temperature. This is done in order to accelerate the setting of the cement, and by the increased heat thus generated to take the place of the temperature below 40 degrees.

Any type or proportion of concrete aggregate may be employed with my compound.

It will be understood that I desire to comprehend within my invention such modifications as may be clearly embraced in my claims and within the scope of my invention.

Having thus fully described my invention, what I claim as new and desire to secure by Letters Patent, is:—

1. A water proofing and accelerating compound for concrete consisting of the product resulting from the combination of a half gallon of water and two pounds of stearic acid, a solution of 3½ to 4 ounces of caustic soda, a solution of from 5 to 6 ounces of calcium chloride and one gallon of water and approximately 10 per cent of powdered form of calcium chloride.

2. In a method of making a wet mix made up substantially of calcium stearate and calcium chloride free from lime waxes and resins for use as a combined mechanical lubricant to water proof cement and accelerate its setting, the steps consisting of mixing water solutions of stearic acid and caustic soda, mixing a water solution of calcium chloride therewith, and introducing dry calcium chloride to accelerate the setting of the cement with the mechanical lubricant.

In testimony whereof, I affix my signature.

FRANK L. ORMESHER.